F. HEGYBELI.
STATION INDICATOR.
APPLICATION FILED OCT. 24, 1919.

1,357,558.

Patented Nov. 2, 1920.
2 SHEETS—SHEET 1.

INVENTOR.
Ferenc Hegybeli
BY
ATTORNEY.

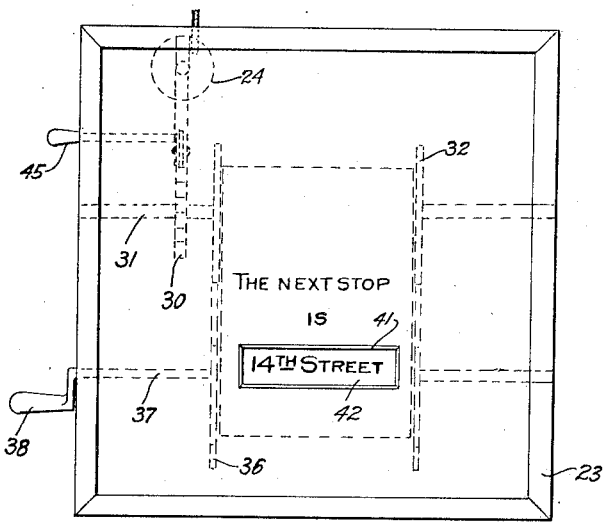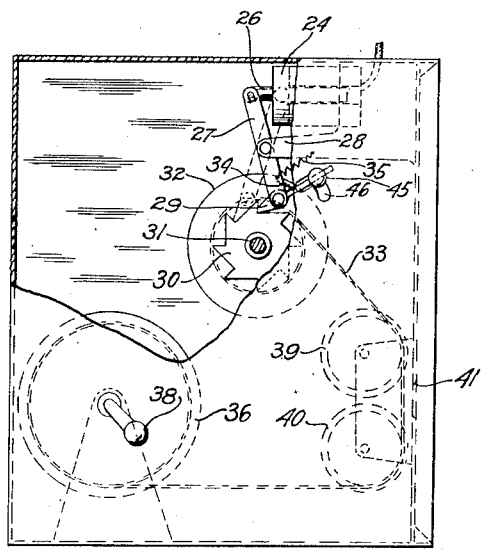

UNITED STATES PATENT OFFICE.

FERENC HEGYBELI, OF CLEVELAND, OHIO.

STATION-INDICATOR.

1,357,558.   Specification of Letters Patent.   Patented Nov. 2, 1920.

Application filed October 24, 1919. Serial No. 332,950.

*To all whom it may concern:*

Be it known that I, FERENC HEGYBELI, a citizen of the United States, residing at Cleveland, county of Cuyahoga, and State of Ohio, have invented certain new and useful Improvements in Station-Indicators, of which the following is a specification.

This invention relates to a station indicator adapted to indicate to the passengers on a car the station at which the car will make the next stop.

The invention has for an object to provide a simple and novel device which will act automatically to indicate the next station stop as the car leaves each station, and which will maintain such indication in view until the following station is reached.

For further comprehension of the invention, and of the objects and advantages thereof, reference will be had to the following description and accompanying drawings, and to the appended claim in which the various novel features of the invention are more particularly set forth.

Figure 1 of the drawings is a diagrammatic elevation illustrating the application of the invention.

Fig. 3 is a front view of the indicator proper.

Fig. 4 is a side view partly broken away, of the indicator proper.

Figure 1:
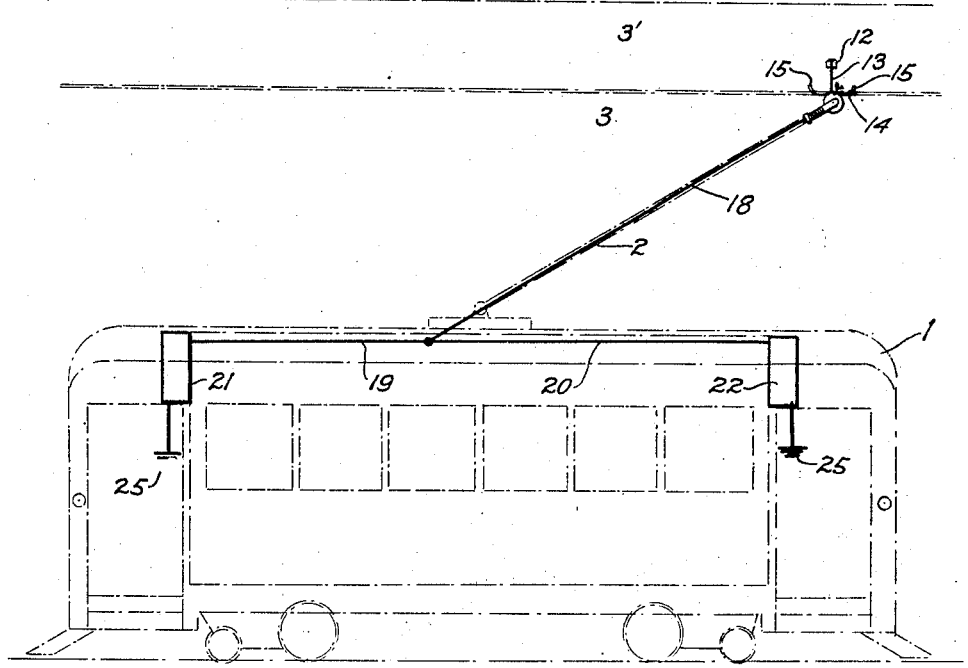
Figure 2:
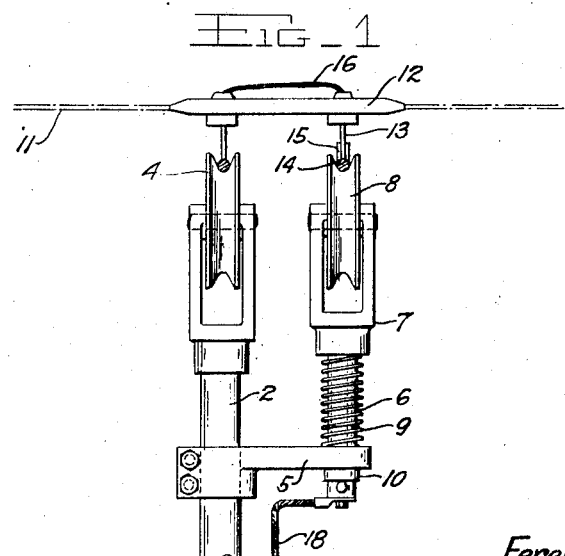
Fig. 2 is a detail fragmentary elevation showing the novel contact making device applied in connection with the usual trolley pole and wire, the trolley wire and fixed contact making member being in section.

A trolley car of ordinary type is shown at 1, and is provided with the usual trolley pole 2 which engages the ordinary overhead trolley wire 3 by means of the wheel 4, a guard wire 3' being indicated above the trolley wire.

Carried upon the trolley pole 2 near the upper end thereof is a bracket 5 in which is slidably held the pin 6 attached to a fork 7 in which is journaled a wheel 8 similar to the wheel 4. A coiled spring 9 surrounds the pin 6 between the bracket 5 and fork 7 and presses the wheel 8 upward, a collar 10 on the projecting lower end of the pin 6 limiting upward movement of the latter, the pin and fork extending parallel to the trolley pole, and the axis of the wheel 8 being approximately in alinement with the axis of wheel 4.

Carried by one of the cross wires 11 which support the trolley wire 3 is a bar 12 from which is hung, by a rod 13, a short horizontal wire section 14 having upturned ends 15, this wire section 14 being electrically connected to the trolley wire 3 as indicated at 16, this wire section being spaced laterally from the trolley wire a distance equal to the spacing of the wheel 8 from the trolley wheel 4, and being on a level with the trolley wire so as to be engaged by wheel 8 when the car reaches the proper point. It is to be understood that one of these wire sections will be located adjacent each station and on the side thereof to be engaged by the wheel 8 as the car leaves the station.

From the inner end of the pin 6 a suitable insulated wire 18 leads down the trolley pole and branches as at 19 and 20 to the indicating devices which are preferably located one at each end of the car as indicated at 21 and 22 in Fig. 1. Each of these indicating devices comprises a box 23 which may be attached by any suitable means to the end wall of the car, or to any desired part.

Within this box is a solenoid 24 to which the branched wire 18 leads, the opposite terminal of the solenoid being grounded as indicated at 25 in Fig. 1. The case 26 of this solenoid has connected thereto one end of a lever 27 which is fulcrumed between its ends to a fixed bracket 28 and carries a pivoted pawl 29 on the opposite end. This pawl 29 engages a ratchet wheel 30 fixed on a horizontal shaft 31 suitably journaled at opposite ends in the side walls of the box and having fixed also thereon a reel 32 to which is attached one end of a tape 33 having printed or marked thereon at proper intervals the names of the different stations along the route of the car. A spring 34 normally presses the pawl 29 against the ratchet wheel, while a second spring 35, connected at one end to the lever 27 and at its other end to the bracket 28, moves the pawl backward over the ratchet wheel after the latter has been advanced.

The opposite end of the tape 33 is attached to a second reel 36 fixed on a shaft 37 journaled in the walls of box 23 and having an exterior crank handle 38 for manual operation. Located near the front wall of the box is a pair of idler rollers 39 and 40 over which the tape 33 passes, the tape being thus brought parallel and adjacent to the front wall of the box which is provided with an aperture 41 of sufficient size to expose the station names, one of which is indicated at 42 in Fig. 3. The words "The next stop is" are preferably painted or otherwise marked on the front face of the box just above the opening 41 as shown in Fig. 3.

The operation is as follows: At the beginning of the run the tape 33 is wound on the reel 36 and positioned to have the first station stop revealed in the opening 41. As the car leaves the first station stop the wheel 8 contacts with the wire section 14 and closes a circuit through branched wires 18 to the solenoid of each indicator. The solenoid being energized its core 26 is retracted, operating lever 27 and causing pawl 29 to rotate reel 32 a fraction of a revolution and advance the tape until the next station stop is indicated in the opening 41. When wheel 8 leaves wire 14 the solenoid is deënergized and spring 35 pulls lever 27 back to its original position. This operation is repeated as each station is successively reached. When the end of the run is reached the tape is rewound on the reel 36, pawl 29 being provided with a handle 45 projecting through a slot 46 in the box 23 whereby it may be lifted from the ratchet wheel 30 when the tape is being rewound.

Having thus described my invention what I claim as new and desire to secure by Letters Patent, of the United States is as follows—

A current collector for electrically operated station indicators for cars comprising in combination with a trolley pole and trolley wire, a contact element arranged horizontally beside the trolley wire, near each station, a wheel resiliently mounted upon the trolley pole and adapted to engage said contact element, the mounting means for said wheel comprising a bracket fixed to the trolley pole near the upper end thereof, a forked pin slidable in said bracket and extending upwardly beside the trolley pole, and a spring yieldingly pressing said forked pin upwardly to establish a contact between said contact element and said wheel, for actuating the indicator, substantially as described and for the purpose set forth.

In testimony whereof I have affixed my signature.

FERENC HEGYBELI.